(No Model.)
E. W. RICE, Jr.
GROUND DETECTOR.
No. 585,287.  Patented June 29, 1897.
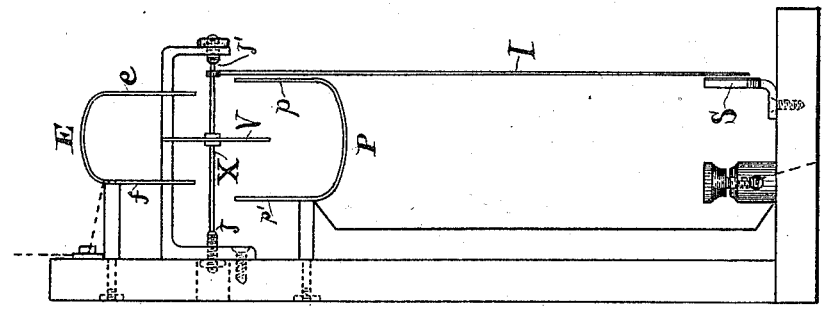
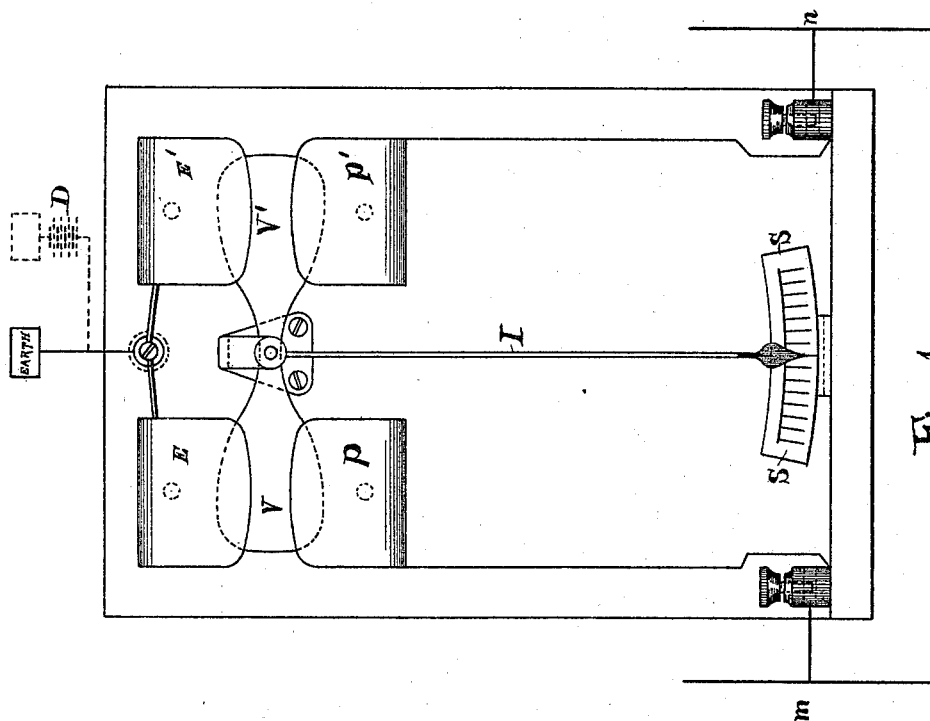
WITNESSES.
Henry D. Westendarp.
John W. Gibboney.
INVENTOR—
Edwin W. Rice, Jr.
Geo. R. Blodgett,
Atty.

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

GROUND-DETECTOR.

SPECIFICATION forming part of Letters Patent No. 585,287, dated June 29, 1897.

Application filed March 1, 1897. Serial No. 625,466. (No model.)

*To all whom it may concern:*

Be it known that I, EDWIN W. RICE, Jr., a citizen of the United States, residing at Schenectady, in the county of Schenectady, State of New York, have invented certain new and useful Improvements in Ground-Detectors, (Case No. 537,) of which the following is a specification.

My invention relates to ground-detectors, particularly for alternating-current circuits; and it has for its object to provide a simple instrument of the static type devoid of connections from the moving part to ground and to the external circuit.

In the instruments of this class with which I am acquainted the moving part is connected in some way to ground or the external circuit; and one of the principal objects of my invention is to dispense with this connection and the use of flexible wires or other connections which impede the movement of the indicator. At the same time I am enabled to use jewels or other hard and delicate bearing-surfaces, so as to obtain the utmost freedom of movement.

To attain the objects pointed out, I construct a ground-detector with pairs of plates respectively connected to opposite sides of the main line and disposed in inductive relation to the moving element, which I preferably construct in the form of vanes of aluminium, so that it may be light and easily moved. Opposite to the first-named set of plates I dispose a second set, which are connected to earth, the plates of the second set being also connected together, so that they stand at the same potential. The vanes, to which is attached a suitable indicating device, are mounted on a transverse axle which rests in jewels provided with suitable adjustments, so that the device may readily turn.

An embodiment of my invention is shown in the accompanying drawings, wherein—

Figure 1 is a front elevation, partly diagrammatic, of an instrument constructed according thereto; and Fig. 2 is a side elevation of the same arrangement.

In Fig. 1, $m$ $n$ are the lines of the alternating circuit, from which leads go to the binding-posts shown and thus to the plates P P'. These plates are mounted so as to be thoroughly insulated from each other and from the rest of the instrument. Between the lines $m$ $n$ any suitable difference of electromotive force is maintained, and the connection of the instrument to the line may be through the usual high-resistance fuses or other safety devices. Above the first plates P P' are ground-plates E E', connected together and to earth. These plates may be either directly connected to ground or may be connected through a small battery or other source of electromotive force, (indicated at D,) so that they are maintained at a fixed potential. Mounted upon suitable jewels is a pair of vanes V V', made, preferably, of aluminium and provided with an indicator or pointer I, moving over the scale S, calibrated in any desired way.

In Fig. 2 the same parts are shown, but from this it will be seen that the plate P is bent so that the front $p$ and the back $p'$ are at a distance from the vane V. This distance would depend upon the potential existing between the mains $m$ $n$ and should be such as to prevent the possibility of current passing to the vanes. Similarly the plate E is bent and the front and back portions $e f$ are also substantially equidistant from the vanes V. This distance, however, may be less than that of plate P from the vane, inasmuch as under normal conditions there is no difference of potential between the plate E and the vane.

It is manifest that the arrangement just pointed out, although a desirable one, inasmuch as the indicator I may be arranged to swing by gravity to any part of the scale desired, might be reversed or the instrument may be turned to swing horizontally by arranging a suitable spring around the axle of the vanes, this being a common device in instruments of this class and therefore not illustrated. Other changes might be made. The number of plates and vanes might be increased, if desired, in a way easily understood, so as to give increased sensitiveness to the instrument.

The shaping of the vanes V V' will be in accordance with the form given to the plates within the electrostatic influence of which they move, and they are to be so shaped that the tendency to rotate will be substantially uniform in different positions, the instrument being otherwise in unstable equilibrium and it being possible to have two points at which the needle would rest under the same conditions, but these methods of adjusting the movement of the indicator are well understood.

The method of operation of the device is substantially as follows: The plates P P' being connected to opposite sides of the alternating circuit, the circuit being properly insulated, so that it is either not grounded at all or grounded equally on both sides, (the latter condition being rare in practice,) the alternating static charges P P' exert attractive forces on the vanes, which are balanced so that the needle does not turn one way or the other. The plates E E' impart no tendency to turn, they being at equal potential or no potential if connected directly to ground. Any charge which may be imparted to the vanes, they being electrically connected, also gives no tendency to rotate under these conditions. If, however, one of the lines, as the line $m$, be accidentally grounded, a difference of charge exists on that side of the circuit, and the indicator I would swing to one side or the other, according to which side happened to be grounded.

It is not absolutely necessary to connect the plates E E' to ground, if they be of comparatively large size or if connected to a condenser of definite potential, but the sensitiveness of the instrument would be impaired in this latter case unless there were some leakage allowed.

It is also evident that the calibration of the scale may be such that the needle will indicate not only which side of the circuit is grounded, but, to a certain approximation, the extent of the difficulty.

What I claim as new, and desire to secure by Letters Patent of the United States, is—

1. In an electrostatic device, the combination of a system of stationary inducing-plates, some of which are connected to one side of the line and others to the other side, a second set of plates maintained at equal potential and insulated from the first, and an indicating device in inductive relation to the stationary plates.

2. In an electrostatic ground-detector, an insulated indicating device composed of a set of vanes with a pointer, in combination with a pair of static inducing-plates respectively connected to two sides of the circuit, and a set of grounded plates of equal potential, the plates being in inductive relation to the vanes of the indicating device.

3. In an electrostatic instrument, the combination of an insulated moving system of vanes and an indicating device attached thereto, with a system of stationary inducing-plates, two of which on one side of the vanes are kept at equal potential and the two others respectively connected to the sides of the alternating-current circuit.

4. In an electrostatic ground-detector, a set of plates E, E' connected together and grounded, other plates P, P' connected to the main line, a set of moving vanes V, V' electrically connected and in inductive relation to the plates, the plates P, P' being farther from the vanes than the others.

In witness whereof I have hereunto set my hand this 25th day of February, 1897.

EDWIN W. RICE, Jr.

Witnesses:
 B. B. HULL,
 C. L. HAYNES.